US007272629B2

(12) United States Patent
Yamaura et al.

(10) Patent No.: US 7,272,629 B2
(45) Date of Patent: Sep. 18, 2007

(54) PORTAL SERVER AND INFORMATION SUPPLY METHOD FOR SUPPLYING MUSIC CONTENT OF MULTIPLE VERSIONS

(75) Inventors: Atsushi Yamaura, Shizuoka-ken (JP); Hiroaki Takahashi, Shizuoka-ken (JP); Takuya Takahashi, Shizuoka-ken (JP); Takaaki Shibata, Tokyo (JP)

(73) Assignee: Yamaha Corporation, Shizuoka-Ken (JP)

( * ) Notice: Subject to any disclaimer, the term of this patent is extended or adjusted under 35 U.S.C. 154(b) by 764 days.

(21) Appl. No.: 10/190,244

(22) Filed: Jul. 3, 2002

(65) Prior Publication Data

US 2003/0037124 A1  Feb. 20, 2003

(30) Foreign Application Priority Data

Jul. 4, 2001 (JP) ............................ 2001-203655

(51) Int. Cl.
*G06F 13/00* (2006.01)
(52) U.S. Cl. ...................................... 709/203
(58) Field of Classification Search ............... 707/3; 709/203
See application file for complete search history.

(56) References Cited

U.S. PATENT DOCUMENTS

| 5,754,938 | A | * | 5/1998 | Herz et al. ................. 725/116 |
| 6,018,654 | A | | 1/2000 | Valentine et al. |
| 6,248,946 | B1 | * | 6/2001 | Dwek .......................... 84/609 |
| 6,256,623 | B1 | * | 7/2001 | Jones ........................... 707/3 |
| 6,539,395 | B1 | * | 3/2003 | Gjerdingen et al. ........ 707/102 |
| 2002/0026442 | A1 | | 2/2002 | Lipscomb |

FOREIGN PATENT DOCUMENTS

| GB | 2345559 | 7/2000 |
| GB | 2 345 559 | 12/2000 |
| JP | 9106293 | 4/1997 |
| JP | 9171504 | 6/1997 |
| JP | 10-187763 | 7/1998 |
| JP | 10-341253 | 12/1998 |

(Continued)

OTHER PUBLICATIONS

European Search Report for Application No. EP 02 01 4035.6, completed Oct. 14, 2003.
Communication from European Patent Office dated Feb. 13, 2004 regarding corresponding European Patent Application No. 02014035.6, 8 pages.
Communication from European Patent Office dated Apr. 21, 2005 regarding corresponding European Patent Application No. 02014035.6.
European Office Action dated Sep. 12, 2005.

(Continued)

*Primary Examiner*—Robert B. Harrell
(74) *Attorney, Agent, or Firm*—Harness, Dickey & Pierce, PLC

(57) ABSTRACT

Portal server connects with a plurality of content supply servers and is also connectable with a client terminal via a communication network. Each of the plurality of content supply servers has music content. The portal server is accessed by the client terminal, and the portal server transmits, to the client terminal, a list of music content suppliable by the content supply servers, in response to a request from the client terminal. Desired music content can be selected in the client terminal on the basis of the list transmitted by the portal server, and selection information specifying the selected music content can be transmitted from the client terminal to the communication network. Then, in response to the selection information, the selected music content can be supplied from the content supply server having the selected music content.

15 Claims, 8 Drawing Sheets

FOREIGN PATENT DOCUMENTS

| | | |
|---|---|---|
| JP | 2000224269 | 8/2000 |
| JP | 2001-175761 | 6/2001 |
| JP | 2001-184292 | 7/2001 |
| JP | 2002-082988 | 3/2002 |
| WO | WO 00/62265 | 10/2000 |
| WO | WO 00/76231 | 12/2000 |
| WO | WO 00/76231 A1 | 12/2000 |
| WO | WO 01/20491 | 3/2001 |
| WO | WO 01/20491 A2 | 3/2001 |
| WO | WO 01/25948 | 4/2001 |
| WO | WO 01/025948 A1 | 4/2001 |

OTHER PUBLICATIONS

"Eleven Record Companies have opened a comprehensive site for distribution over communication networks", Music Distribution Business Comprehensible by Graphic Explanation, written and edited by Katsuji Umeda, section 34, p. 35, published by Japan Management Association Management Center on Oct. 1, 2000.

"Pro Debut with a Ringer Melody" DTM MAGAZINE, vol. 8, third issue, p. 28, published by Terashima Information Planning on Feb. 1, 2001.

* cited by examiner

PORTAL SERVER AND INFORMATION SUPPLY METHOD FOR SUPPLYING MUSIC CONTENT OF MULTIPLE VERSIONS

BACKGROUND OF THE INVENTION

The present invention relates generally to music information supply systems for communicating (transmitting/receiving) music information (music content), such as information representative of music pieces and effect sounds, between individual apparatus via a wired or wireless communication network such as the Internet, and particularly to portal servers serving as the center of such music information supply systems. For example, the present invention relates to a music content supply technique which, in a case where music information is used to produce incoming-call alerting melodies, alarm sounds, background music tones, etc. for use in portable communication terminal apparatus such as portable (cellular) phones, allows users to purchase music piece data of a same music piece possessed by a plurality of music information servers by providing an improved portal server that functions as an entrance to the users for connection to the music information servers (music content servers).

Today, music information supply services are widely employed which use desired music pieces as incoming-call alerting melodies, alarm sounds, background music tones, etc. for portable communication terminal apparatus such as portable (cellular) phones. On a communication network, there exist a plurality of music information servers (music content servers) independently of each other, and each of these music information servers possesses its own music piece database. When a user of a portable communication terminal apparatus wants to purchase desired music piece data (music content) to be used as an incoming-call alerting melody, it has been conventional for the user to access a desired one of the music information servers and enter various search words or conditions, such as the name and musical genre of the desired music piece, to thereby download, from the desired music information server, the music piece data matching the entered search conditions. In downloading the music piece data, the music information server carries out a predetermined billing process, e.g. billing per music piece or collective billing per month. Further, the user has to pay data communication charges (packet charges) for transmitting one or more various search conditions and receiving a list of music piece data sets having been found by the search.

Generally, music piece data sets possessed by the individual music information servers differ in details (such as arrangement, musical key and/or chordal construction) among the music information servers even if the music piece data sets are of a same original music piece, and therefore the musical quality of the music piece data sets would also differ from one music information server to another. However, before the desired music piece data set is downloaded from one of such music information servers and then audibly reproduced by the portable communication terminal apparatus, the user of the terminal apparatus can not know how the desired music piece data set plays. Therefore, even when the music piece data set delivered from the music information server is not satisfactory or agreeable to the user, the predetermined billing process is performed by the server to bill the user for the music piece data set, which results in wasteful expense for the user. Thus, to effectively acquire a desired music piece data set, the user has perform a series of operations of entering and transmitting one or more predetermined search conditions, then receiving searched results and then downloading and audibly reproducing the desired music data set, separately for each of the individual music information servers possessing music piece data sets based on a same original music piece. In such a case, the user has incurred an increased downloading cost that is almost equivalent to a cost for downloading music piece data sets of a plurality of music pieces, as well as an increased data communication charge due to communication with the plurality of music information servers. Further, the music information servers accessed by the user do not necessarily possess desired music piece data sets, and thus the operations for searching the desired music piece data set may lead to a waste of money and time. In addition, it is not easy for the user to judge which of the music information servers possesses the desired music piece data set having superior quality and meeting his or her demand.

SUMMARY OF THE INVENTION

In view of the foregoing, it is an object of the present invention to provide an improved music information supply system which can manage a plurality of music information servers (music content servers) on a communication network in a collective manner and which can be easily used by users. Particularly, the present invention seeks to provide an improved portal server serving the center of such a music information supply system.

According to one aspect of the present invention, there is provided a portal server connecting with a plurality of content supply servers and also connectable with a client terminal via a communication network, each of the plurality of content supply servers having music content. The portal server comprises: a first transmission section that transmits a list of music content, suppliable by the content supply servers, in response to a request from the client terminal, so that, in the client terminal, desired music content can be selected on the basis of the list transmitted by the portal server; a first reception section that receives selection information, based on the selection of the desired music content in the client terminal, transmitted by the client terminal; and a second transmission section that, on the basis of the selection information received by the first reception section, transmits instruction information to urge at least one of the plurality of content supply servers to transmit the desired music content to the client terminal. Thus, the content supply server having received the instruction information is capable of transmitting the desired music content to the client terminal directly or via the portal server.

The portal server is accessed by the client terminal via the communication terminal, and the portal server transmits, to the client terminal, a list of music content suppliable by the content supply servers, in response to a request from the client terminal. Thus, the portal server allows the client terminal to select desired music content on the basis of the list. The client terminal may be arranged to transmit, to the communication network, selection information specifying the desired music content having been selected on the basis of the list. As an example, the selection information may include content identification information for identifying music content and content-supply-server identification information for identifying a content supply server. The content supply server identified by the content identification information may be arranged to supply the selected desired music content to the client terminal. The music content supplied to the client terminal may be music content for test-listening by a user of the client terminal or music content for purchase by the user of the client terminal; alternatively, a selection may be made between the test-listening music content and the for-purchase music content.

As an example, a list enumerating all music content (e.g., music content of a given music piece name) suppliable by the content supply servers may be transmitted to the client terminal in response to a given search request (e.g., a search request for the given music piece name) given from the client terminal, so as to allow the user of the client apparatus to select desired music content from the plurality of content supply servers. In this way, any one of various variations of music content having a same music piece name can be selected from the plurality of content supply servers. By the portal server thus collectively managing the plurality of content supply servers, the user of the client terminal can select desired music content and then test-listen to or purchase the selected desired music content by only accessing the portal server. As a result, the present invention allows the user to save wasteful expense and minimize a necessary communication time and communication charge.

According to another aspect of the present invention, there is provided a portal server connecting with a plurality of content supply servers and also connectable with a client terminal via a communication network, each of the plurality of content supply servers having music content, which comprises: a first transmission section that transmits a list of music content, suppliable by the content supply servers, in response to a request from the client terminal, so that, in the client terminal, desired music content can be selected on the basis of the list transmitted by the portal server; and a second transmission section that transmits, to the client terminal, data related to a virtual community space pertaining to the plurality of content supply servers or music content possessed by the plurality of content supply servers.

As an example, the virtual community space may include at least one of a public information space where a user of the client terminal is allowed to write in desired information or read or view desired information, a space for showing statistical information indicative of respective popularity of the plurality of content supply servers, a space for showing statistical information indicative of respective popularity of individual music content and a space for showing statistical information indicative of respective popularity of music content producers. Also, as an example, the portal server may further comprise a classification section that classifies the plurality of client terminals, connected with the portal server, into client groups, so that any one of the client terminals belonging to a particular one of the client groups is allowed to use a group mail to communicate information with any other client terminal within the same client group. The classification section may cumulatively store music-content purchase history information of each of the client terminals and automatically classify the client terminals into the client groups on the basis of the thus cumulatively-stored music-content purchase history information.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF EMBODIMENTS

Figure 1:
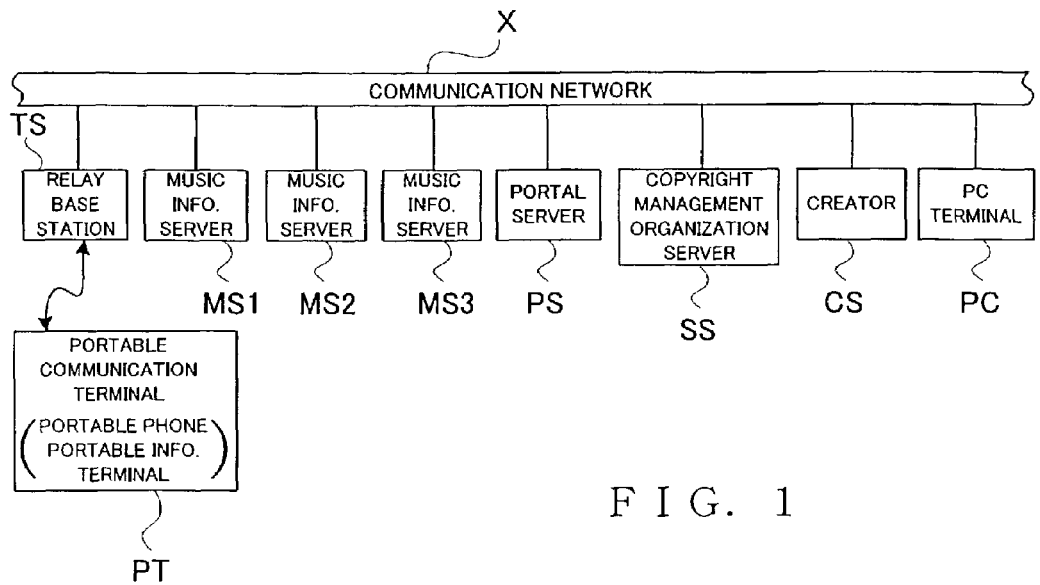
FIG. 1 is a block diagram showing a general setup of a music information supply system employing a portal server in accordance with an embodiment of the present invention.

FIG. 1 is a block diagram showing an exemplary general setup of a music information supply system employing a portal server in accordance with an embodiment of the present invention. This music information supply system includes a plurality of music information servers (music content supply servers) MS1, MS2 and MS3, and the portal server PS connected via a communication network X with the plurality of music information servers MS1, MS2 and MS3 and serving as a door or entrance to a plurality of client terminal apparatus for connection to the music information servers MS1, MS2 and MS3. The plurality of client terminal apparatus can each access any desired one of the servers MS1, MS2 and MS3 via the communication network X. Each of the music information servers MS1, MS2 and MS3 may be a conventional type of independent music information provider (information provider), which possesses its own music piece database. The portal server PS collectively manages music piece data sets (items of music content information) possessed by the individual music information servers MS1, MS2 and MS3, and supplies desired music piece data sets to the client terminal apparatus. According to the present invention, each of the client terminal apparatus can access the portal server PS so as to acquire desired music information from a desired one of the music information servers MS1, MS2 and MS3 via the portal server PS. Of course, each of the client terminal apparatus can access each individual server MS1, MS2 or MS3 directly, without the intervention of the portal server PS, in the conventionally-known manner. The above-mentioned client terminal apparatus may be in the form of a portable communication terminal PT such as a portable phone or portable information terminal, or a non-portable communication terminal such as a personal computer terminal PC. The portable information terminal is, for example, a PDA (Personal Data (Digital) Assistant) or portable personal computer, which can be connected to the communication network X by wired or wireless communication. Specifically, a relay base station TS is also connected to the communication network X so that the portable communication terminal PT is first connected to the relay base station TS by wireless communication and then connected to the communication network X via the relay base station TS, as well known in the art. As servers related to the portal server PS or music information servers, there may be provided, on the communication network X, one or more copyright management servers SS, music-piece-data producer servers CS and the like. The following paragraphs describe the present invention in relation to the case where the client terminal apparatus is the portable communication terminal PT.

As well known in the art, the portable communication terminal PT can access any desired one of the above-mentioned servers connected to the communication network X, such as the Internet, by designating an URL (Uniform Resource Locator) composed of a predetermined character string indicative of a unique network address. The various servers and portable communication terminal PT are connectable with each other via the communication network X, like a LAN (Local Area Network), telephone line network, etc., for bidirectional communication. The portable communication terminal PT can access any one of the servers, desired by the user, in accordance with user entry of the predetermined address such as the URL, and thereby acquire desired content from the accessed server. Communication (transmission/reception) of various information between the client terminal and the servers is carried out using a predetermined software program such as an Internet browser.

As also known in the art, the servers each have stored therein a multiplicity of HTML (Hyper Text Markup Language) programs and content data related to Web sites for presenting various information to the client terminal. In response to designation of an URL or the like from any one of the client terminal, the corresponding server delivers an HTML program and content data pertaining to the corresponding Web site.

Figure 2:
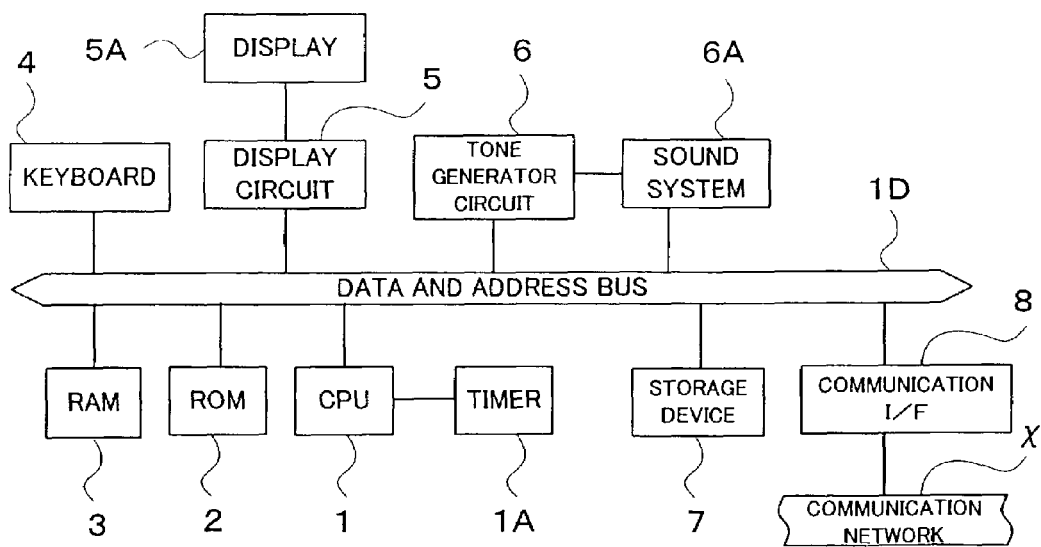
FIG. 2 is a block diagram showing an exemplary general hardware setup of any one of music information servers and portal server shown in FIG. 1.

Now, with reference to FIG. 2, a description will be made about an exemplary general hardware setup of the portal server PS shown in FIG. 1. The portal server PS is controlled by a microcomputer comprising a microprocessor unit (CPU) 1, a read-only memory (ROM) 2 and a random-access memory (RAM) 3. The CPU 1 controls all operations of the portal server PS. To the CPU 1 are connected, via a data and address bus ID, the ROM 2, RAM 3, keyboard 4, display circuit 5, tone generator circuit 6, storage device 7, and communication interface (I/F) 8. Also connected to the CPU 1 is a timer 1A for counting various time periods, for example, to signal interrupt timing for timer interrupt processing.

The ROM 2 has prestored therein various programs to be executed by the CPU 1 and various data to be referred to by the CPU 1. The RAM 3 is used as a working memory for storing various data generated as the CPU 1 executes the programs. The RAM 3 is also used as a memory for storing the currently-executed program and data related thereto. Predetermined address regions of the RAM 3 are allocated to various functions and used as registers, flags, tables, memories, etc. The keyboard 4 is in the form of a combination of a ten-button keypad for manual entry of numeric value data and keyboard for manual entry of character data such as a URL and one or more content search conditions. The display circuit 5 visually displays, on a display device 5A such as a liquid crystal display (LCD) panel or CRT (Cathode Ray Tube), various information, controlling states of the CPU 1, etc. The tone generator (T.G.) circuit 6 receives musical tone data supplied via the data and address bus 1D and generates tone signals on the basis of the received musical tone data. The tone generator circuit 6 may be constructed to provide a plurality of tone generating channels using a single circuit on a time-divisional basis or provide each tone generating channel using a single circuit (one circuit per channel). The tone generator circuit 6 and sound system 6A may be constructed in any desired conventional manner. The tone generator circuit 6 may employ any of the conventionally-known tone synthesis methods, such as the waveform memory method, FM method, physical model method, harmonics synthesis method, formant method, analog synthesizer method and analog synthesizer simulation method. Further, the tone generator circuit 6 may be implemented either by dedicated hardware or by software processing executed by the CPU 1. Note that the portal server PS need not necessarily be provided with the tone generator circuit 6 and sound system 6A.

Storage device 7 has stored therein various information related to music piece data sets possessed by the music information servers MS1 to MS3 managed by the portal server PS, predetermined programs (such as a JAVA (trademark) program for downloading incoming-call alerting melodies) to be delivered to the client terminal, etc. The storage device 7 also has stored therein data related to control of the various programs for execution by the CPU 1. Where a particular control program is not prestored in the ROM 2, the control program may be prestored in the storage device (e.g., hard disk device) 7, so that, by reading the control program from the storage device 7 into the RAM 3, the CPU 1 is allowed to operate in exactly the same way as in the case where the particular control program is stored in the ROM 2. This arrangement greatly facilitates version upgrade of the control program, addition of a new control program, etc. The storage device 7 may use other storage media than the hard disk (HD), such as any of various removable-type storage media like a floppy disk (FD), compact disk (CD-ROM or CD-R/RW), magneto-optical disk (MO) and digital versatile disk (DVD). The portal server PS is connected to the communication network X via the communication interface 8 to perform communication with any one of the other servers and client terminal apparatus.

Figure 3:
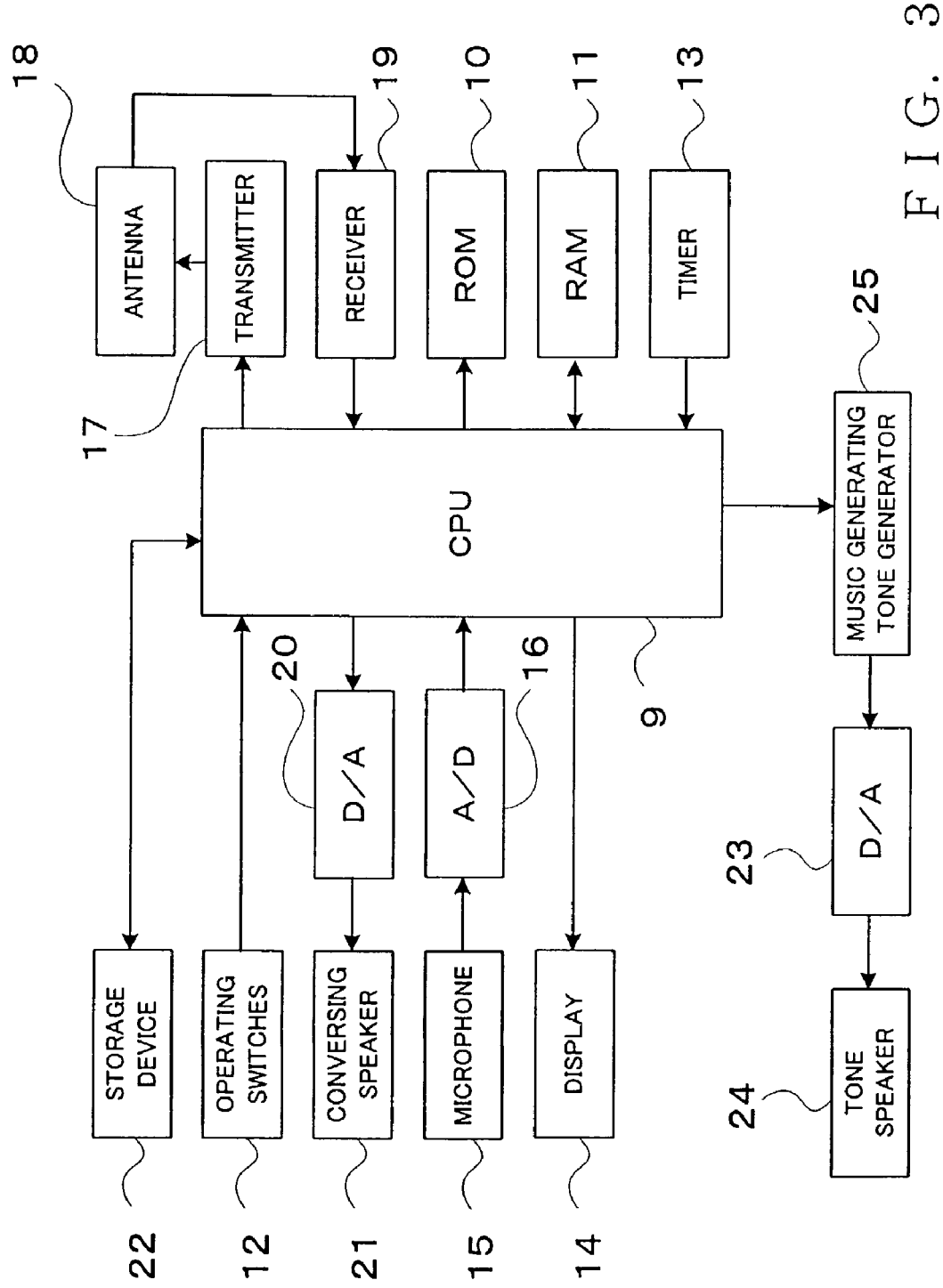
FIG. 3 is a block diagram showing an exemplary general hardware setup of a portable phone shown in FIG. 1.

Next, with reference to FIGS. 3 and 4, a description will be made about an exemplary general hardware setup of the portable communication terminal PT such as a portable (cellular) phone or other portable or mobile information terminal. Specifically, FIG. 3 is a block diagram showing an exemplary general hardware setup of the portable phone. This portable phone is controlled by a microcomputer comprising a CPU 9, a ROM 10 and a RAM 11. Timer 13, ROM 10 and RAM 11 operate in a similar manner to the timer, ROM and RAM of the portal server PS having been described above in relation to FIG. 2, and hence will not be described here to avoid unnecessary duplication. To the CPU 9 are connected, in addition to the timer 13, ROM 10 and RAM 11, a group of operating switches 12, display device 14, microphone 15, transmitter 17, receiver 19, conversing speaker 21, storage device 22, music generating tone generator 25, etc.

The portable phone includes the transmitter 17 and receiver 19 as communication input and output interfaces, and it carries out wireless communication with the relay base station TS via an antenna 18 to thereby communicate various information with the portal server PS and music information servers MS. The storage device 22 may be pre-installed within the body of the portable phone, or may be externally connected to the body of the portable phone by a cable. In the case where the storage device 22 is pre-installed within the body of the portable phone, it is preferable that the storage device 22 be in the form of a semiconductor memory (e.g., flash memory) having a relatively small size. On the other hand, in the case where the storage device 22 is externally connected to the body of the portable phone, the storage device 22 may be in the form of any one of a hard disk (HD), floppy disk (FD), compact disk (CD-ROM or CD-R/RW), magneto-optical disk (MO) and digital versatile disk (DVD) similarly to the storage device 7 of the portal server PS. Music piece data, program, etc. received from the server are stored in the non-volatile storage device 22 and then transferred to the RAM 11 for use in the portable phone. The operating switches 12 include numerical keys and other operator switches provided on the body of the portable phone.

The conversing speaker 21 of the portable phone is a dedicated speaker that functions to audibly generate voices of the other party during telephone conversation in accordance with analog voice signals converted from digital representation via a D/A converter 20. Namely, digital voice signals representative of voices of the other party received via the receiver 19 are converted into analog signals and passed to the conversing speaker 21, which in turn audibly generate the other party's voices in accordance with the converted analog signals. Voice signals input via the microphone 15 are converted via an A/D converter 16 into digital signals. The display device 14 is, for example, a liquid crystal display, which can visually display various information received from the portal server PS. The music generating tone generator 25, which is provided for generating musical tones, generates tone signals on the basis of music piece data etc. received via the receiver 19 or music piece data read out from the storage device 22. The thus-generated tone signals are audibly reproduced or sounded via a D/A converter 23 and tone speaker 24. In this way, a music piece or effect sounds can be generated, in accordance with music piece data or the like received from any one of the servers, as an incoming-call alerting melody or the like. The music generating tone generator 25 may be constructed in a similar manner to the above-described tone generator circuit 6 of the portal server PS.

Figure 4:
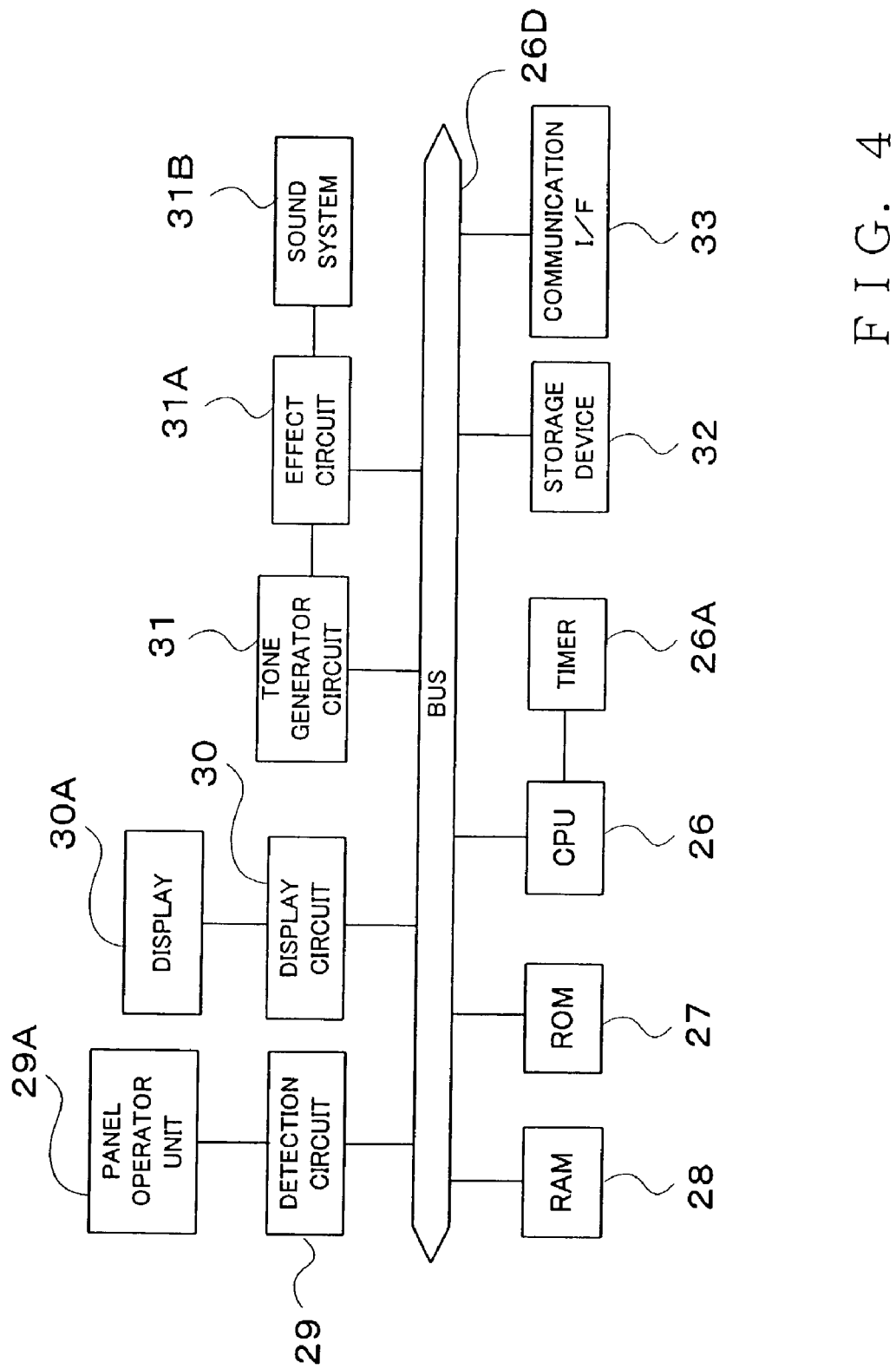
FIG. 4 is a block diagram showing an exemplary general hardware setup of a portable information terminal shown in FIG. 1.

FIG. 4 is a block diagram showing an exemplary general hardware setup of a portable information terminal like a PDA that is used as the portable communication terminal PT. This portable information terminal is controlled by a microcomputer comprising a CPU 26, a ROM 27 and a RAM 28. Similarly to the above-described apparatus, to the CPU 26 of the portable information terminal are connected, via a data and address bus 26D, a CPU 26, timer 26A, ROM 27, RAM 28, detection circuit 29, display circuit 30, tone generator circuit 31, effect circuit 31A, storage device 32 and communication interface (I/F) 33.

The portable information terminal used in the instant embodiment is connected via the communication interface 33 to the communication network X to communicate various information with any one of the servers. The storage device 32 functions in a similar manner to the storage device 22 of FIG. 3 and may be in the form of a non-volatile memory similarly to the storage device 22. Panel operator unit 29A comprises a combination of numerical keys, character-inputting keyboard, various operating switches and other switches. The detection circuit 29 detects respective operating states of the switches and outputs switch information, corresponding to the detected operating states, to the CPU 26 via the data and address bus 26D. The display circuit 30 visually displays various information acquired from any one of the servers, controlling states of the CPU 26, etc. on the display device 30A comprising a liquid crystal display (LCD) or CRT (Cathode Ray Tube).

The tone generator circuit 31 receives music piece data via the data and address bus 26D and generates tone signals on the basis of the received music piece data. The thus-generated tone signals are audibly reproduced or sounded via a sound system 31B including an amplifier and speaker. The effect circuit 31A imparts predetermined effects to the tone signals. The tone generator circuit 31 may be constructed in any desired manner similarly to the tone generator circuit 6 of the portal server PS.

Figure 5:
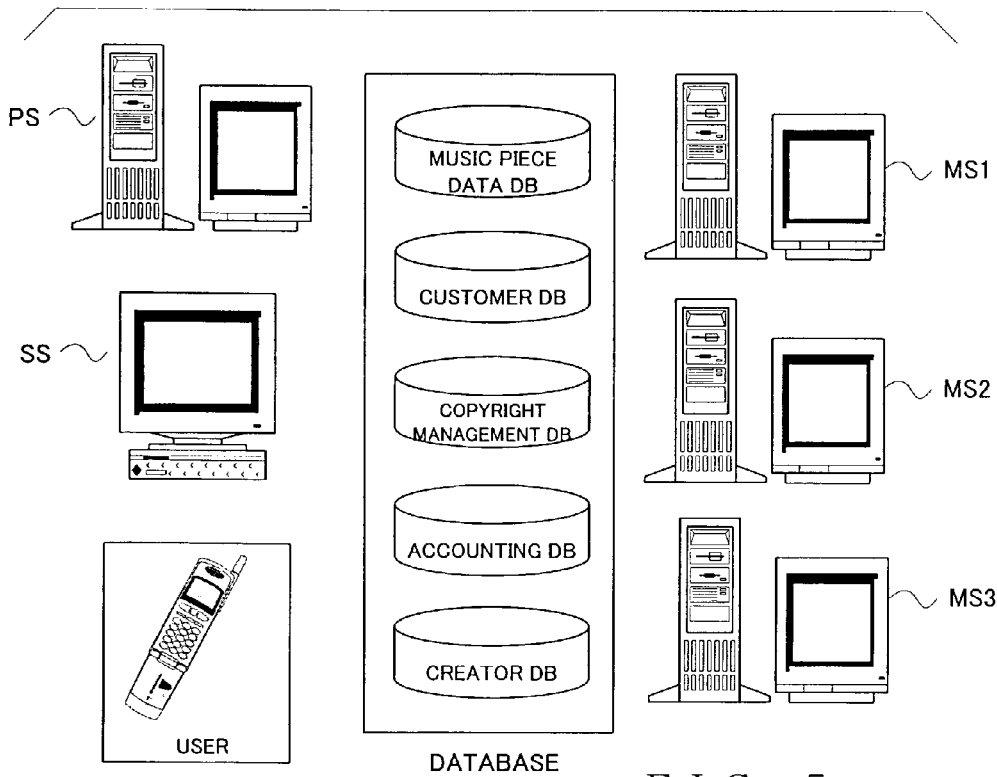
FIG. 5 is a conceptual diagram showing exemplary cooperative relationships between the servers and databases possessed by the servers in the music information supply system shown in FIG. 1.

Next, an explanation is given below about databases and exemplary cooperative relationships among the servers possessing the databases, with reference to FIG. 5. Specifically, FIG. 5 is a conceptual diagram showing an example of the cooperative relationships among the servers and databases possessed by the databases. Here, the music piece database has cumulatively stored therein a multiplicity of music piece data sets, the customer database has cumulatively stored therein a multiplicity of various items of information about users of various portable communication terminals PT, the copyright management database has cumulatively stored therein a multiplicity of various items of information about copyright management including collection of royalties on copyrights, the accounting database has cumulatively stored therein a multiplicity of various items of information about billing and collecting of charges to and from users of the client terminal apparatus, and the music piece data producer (creator) database has cumulatively stored therein a multiplicity of various items of information about producers of music piece data. These databases are possessed by the portal server PS, music information servers MS1, MS2 and MS3, copyright management organization server SS, etc. in accordance with the respective functions of these servers. For example, each of the music information servers MS1 to MS3 possesses its own music piece database, the portal server PS possesses the customer database and accounting database, and the copyright management organization server SS possesses the copyright management database.

The portable communication terminals PT and individual servers are capable of using each of the above-mentioned databases by way of, i.e. by intervention of, the portal server PS. When the portal server PS has received a search request for a particular music piece from the user of any one of the client terminals, it can make reference to the databases possessed by the music information servers MS1 to MS3 in order to search for the particular music piece. Further, when music piece data are to be transmitted directly from a particular one of the music information servers to the user of any one of the client terminal apparatus as will be later described, the particular music information server can know the address of the user in question from the customer database possessed by the portal server PS. By thus allowing each of the servers to use any of the various databases in a corporative fashion, the music information servers need not perform the customer management, etc. and hence can concentrate on delivery of music piece data. Such an arrangement leads to reduced management costs, which is extremely preferable.

Figure 6:
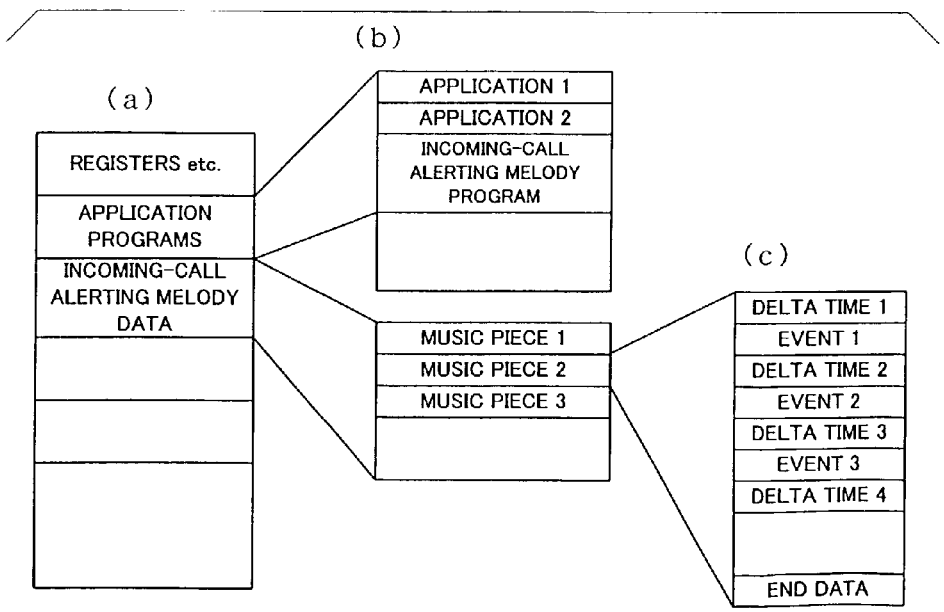
FIG. 6 is a schematic diagram showing an exemplary organization of data stored in a RAM of a client terminal apparatus shown in FIG. 1.

This paragraph describe an exemplary organization of data stored in the RAM 11 or 28 of the client terminal apparatus, with reference to FIG. 6. Specifically, section (a) of FIG. 6 shows an example of data stored in the RAM of the client terminal apparatus, while sections (b) and (c) show details of the stored contents of the RAM in a hierarchical manner. As illustrated in section (a) of FIG. 6, the RAM of the client terminal apparatus stores, in addition to data stored in working registers, various application programs (e.g., JAVA (trademark) application programs) and various data (including music tone data for incoming-call alerting melodies). As illustratively shown in section (b) of FIG. 6, an incoming-call alerting melody program, which is used to practice the present invention is stored in the client's RAM as one application program. Note that "application 1" and "application 2" in the illustrated example are other necessary application programs than the incoming-call alerting melody program. As also illustrated in section (b) of FIG. 6, the client's RAM is capable of storing incoming-call alerting melody data sets of a plurality of music pieces, such as "music piece 1", "music piece 2" and "music piece 3". The format of the incoming-call alerting melody data set of each music piece may be similar to the conventionally-known format of automatic performance sequence data, such as the MIDI or simplified MIDI format. As shown in section (c) of FIG. 6, for example, the incoming-call alerting melody data set of each music piece comprises a sequence of combinations of performance event data (event 1, event 2, . . . ) representative of note-related events, such as note-on and note-off events, or program changes for changing tone colors and delta time data (delta time 1, delta time 2, . . . ) each representing occurrence timing of event data by a relative time measured from the preceding event data, and end data. The melody performance data may be constructed in any other suitable conventionally-known format, without being limited to the above-described, such as an "absolute time" format in accordance with which the occurrence timing of event data is set by an absolute time measured from the beginning of the music piece or from the beginning of a measure, or a "solid" format in accordance with which a storage region is provided per minimum performance resolution and each performance event is recorded in a predetermined storage region of the RAM corresponding to the occurrence timing of the performance event.

Figure 7:
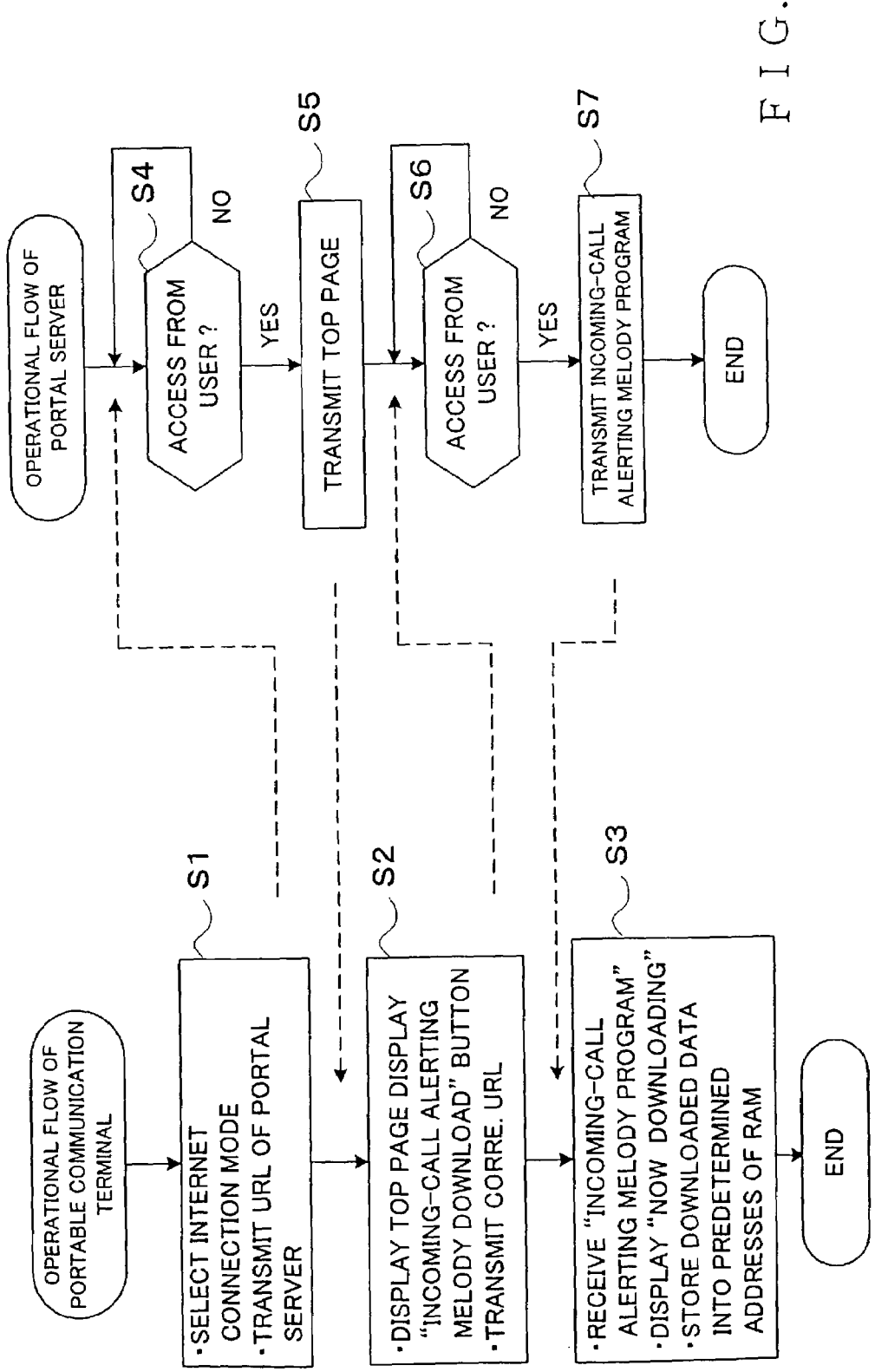
FIG. 7 is a flow chart showing an exemplary step sequence of a process for downloading an "incoming-call alerting melody program" which is carried out between the client terminal and the portal server in the embodiment of FIG. 1.

When the user wants to use the music information supply system of the present invention, the user uses his or her portable communication terminal PT (client terminal apparatus) to access the portal server PS so that the incoming-call alerting melody program is first downloaded from the portal server PS to the portable communication terminal PT. Example of a step sequence of the downloading process is explained here, with reference to a flow chart of FIG. 7. In FIG. 7, the left flow (steps S1 to S3) shows an example of processing carried out by the portable communication terminal PT, while the right flow (steps S4 to S7) shows an example of processing carried out by the portal server PS in correspondence with the processing by the portable communication terminal PT. At step S1, the user enters the URL of the portal server PS to access the portal server PS via the communication network X. The portal server PS is constantly making a determination as to whether there has been access from the user of any one of the client terminal apparatus (step S4). If there has been access from the user of any one of the client terminal apparatus (YES determination at step S4), the portal server PS delivers, to the client terminal apparatus, data of a top page showing various services of the music information supply system, at step S5.

Then, the client terminal displays the top page screen on the basis of the data received from the portal server PS, at step S2. On the top page screen, there is shown a download command button labeled "incoming-call alerting melody program download". By turning on (clicking) the download command button, the user can request downloading of the incoming-call alerting melody program from the portal server PS. Namely, once the download command button is activated, the client terminal transmits the URL of the portal server PS, at step S2. When the portal server PS has detected such access from the user of the client terminal as determined at step S6, the portal server PS delivers the program data corresponding to the requested incoming-call alerting melody program to the client terminal in question, at step S7.

At step S3, the client terminal apparatus receives the program data corresponding to the requested incoming-call alerting melody program from the portal server PS, displays a message "now downloading" and executes the downloading of the program data. Also, the downloaded program data are stored in a predetermined address region of the RAM (section (b) of FIG. 6). Note that when the user of any one of the client terminal apparatus wants to start using the music information supply system, the user has to access the portal server PS for necessary enrollment (registration) procedure to join the system, although not specifically described here.

Figure 8:
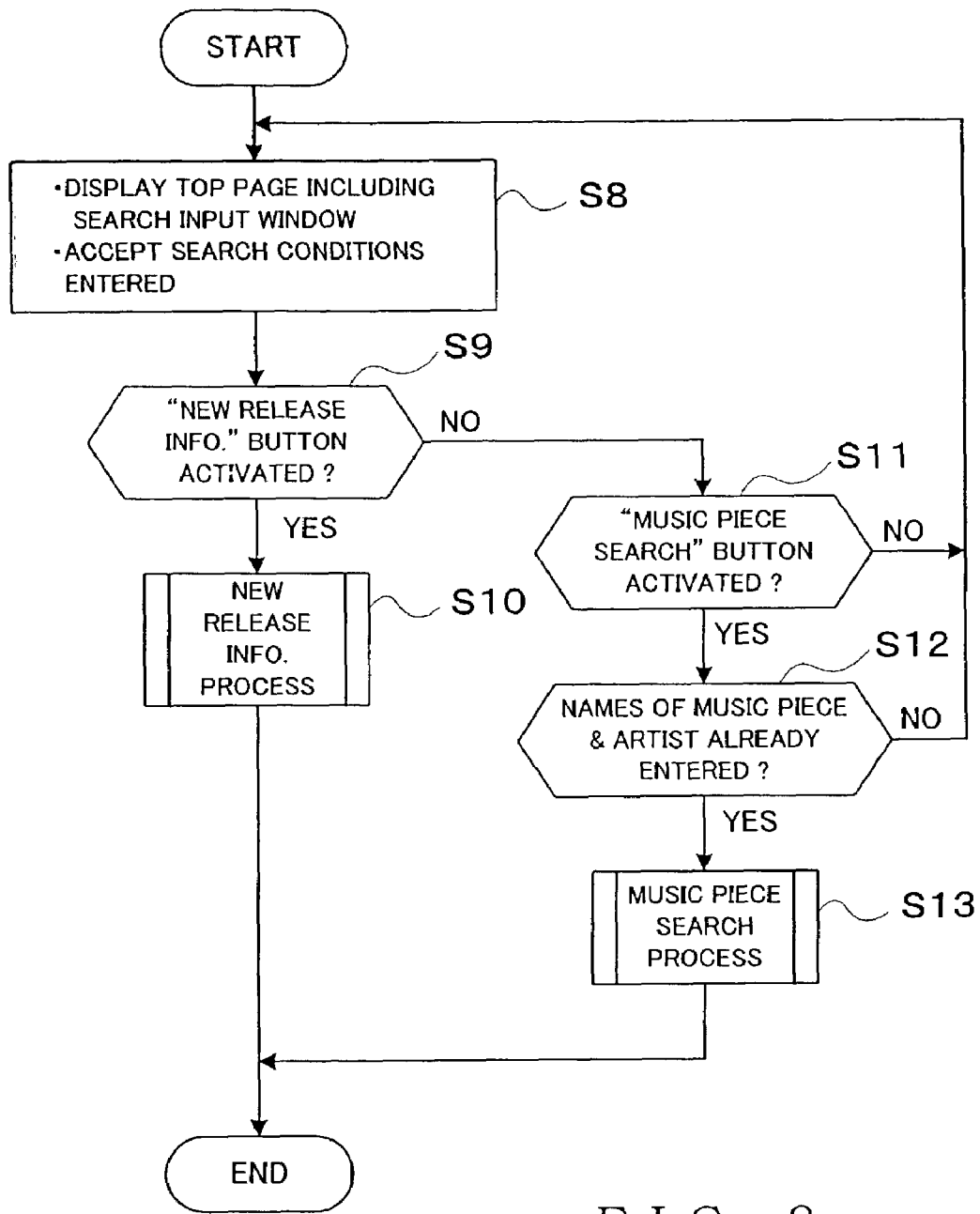
FIG. 8 is a flow chart showing an example of the incoming-call alerting melody program.

Various operations, such as a search, selection, test-listening and purchase, for a desired incoming-call alerting melody, are carried out in accordance with the incoming-call alerting melody program. FIG. 8 is a flow chart showing an example of the incoming-call alerting melody program. To start the incoming-call alerting melody program, the user performs operation for selecting the "incoming-call alerting melody program", for example, on an application program selecting screen. At first step S8, a predetermined top page screen is displayed, which includes a search input window to be used for entry of one or more predetermined search words or conditions (e.g., the title or artist's name of a music piece), command button "New Release Information", command button "Music Piece Search", etc. in addition to a selecting menu. At step S8, the client terminal apparatus also accepts the search conditions entered into the search input window. At next step S9, a determination is made as to whether or not the "New Release Information" button has been selected by the user. If the "New Release Information" button has been selected (YES determination at step S9), a predetermined new release information is carried out at step S10.

If the "New Release Information" button has been selected (NO determination at step S9), it is further determined at step S11 whether the "Music Piece Search" button has been selected by the user. If the "Music Piece Search" button has not been selected (NO determination at step S11), the program reverts to step S8 to repeat the above-described operations. If, on the other hand, the "Music Piece Search" button has been selected (YES determination at step S11), a further determination is made at step S12 as to whether or not the title or artist's name of the music piece has been entered by the user. If answered in the negative at step S12, the program reverts to step S8 to repeat the above-described operations. If, on the other hand, the title or artist's name of the music piece has been entered by the user (YES determination at step S12), then a predetermined music piece search process is carried out at step S13.

Figure 9:
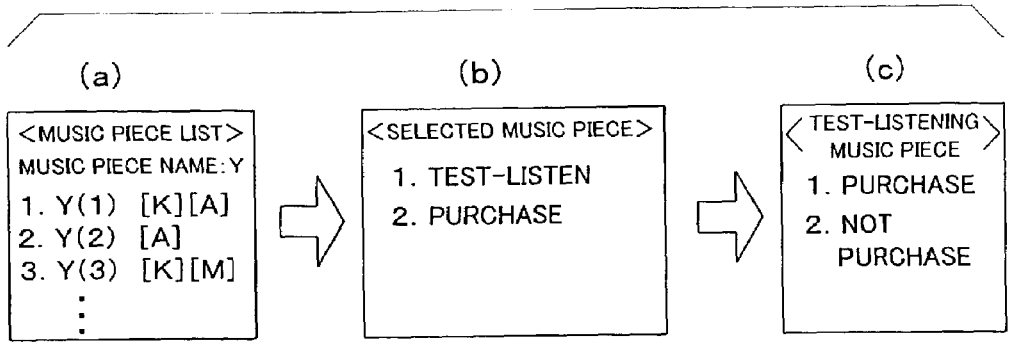
FIG. 9 is a conceptual diagram showing examples of screens displayed at the time of a music piece search.

Example of the music piece search process of step S13 above is described with reference to FIG. 9. FIG. 9 is a schematic diagram showing examples of screens displayed on the client terminal apparatus during the music piece search process. Let it be assumed here that a given music piece name "Y" has been entered as a search condition for the music piece search. Then, data indicative of the entered music piece name "Y" is transmitted from the client terminal apparatus to the portal server PS. In turn, the portal server PS inquired of the plurality of music information servers MS1 to MS3 about their music content information, in accordance with the request from the client terminal apparatus, to thereby acquire lists of music piece data sets, possessed by the individual music information servers, corresponding to the name Y of the requested music piece, then combines the acquired lists into a single music piece list, and transmits the thus-created music piece list to the client terminal apparatus. The client terminal apparatus then visually displays the music piece list, received from the portal server PS, on its display device. Specifically, section (a) of FIG. 9 shows an example of the music piece list for the music piece name "Y" displayed on the client's display device. In the illustrated example of section (a), "Y(1)", "Y(2)", "Y(3)", . . . are, in effect, strings of texts to distinguish among various variations or versions of the music piece data set of the designated music piece name "Y"; for convenience, "Y(1)", "Y(2)", "Y(3)", . . . are indicated by signs instead of the strings of texts. For example, the text string of "Y(1)" may contain the music piece name "Y", name of a human player playing the music piece, name of a server supplying the music piece data set, etc. In a case where a same server is capable of supplying two or more versions of the music piece data set for the music piece name "Y", the text string may contain text information to distinguish between the versions suppliable by the same server. Further, because even a same music piece differs in musical quality between the music piece information servers supplying the respective music piece data sets, appropriate indications are made on the music piece list screen for distinguishing among the music piece data sets. Further, on the music piece list screen, there may be additionally displayed predetermined marks to impart respective quality-related information, such as information about the arrangement and musical key, to the music piece data sets. Specifically, in the illustrated example of section (a) of FIG. 9, the music piece data sets are imparted with mark "[K]" indicating that the music piece data set to be supplied is of an original musical key, i.e. a musical key faithfully corresponding to the key of the original music piece, mark [A] indicating that the music piece data set to be supplied is of original arrangement, i.e. arrangement faithfully corresponding to the arrangement of the original music piece, and mark [M] indicating that the music piece data set to be supplied comprises data arranged/mixed by the producer of the music piece data set. These items of information will be very useful to the users of the client terminal apparatus, since they can provide effective guides for the users to select and purchase a desired music piece data set. Thus, the users can be prevented from undesirably purchasing an unnecessary music piece data set, so that they can minimize wasteful expense.

Once the user selects a desired music piece from the music piece list screen by means of a predetermined selection means like a cursor key and activates a predetermined "Enter" key, a screen is displayed on the client's display device for making a selection as to whether (1) the selected music piece should be test-listened to or (2) the selected music piece should be purchased, as illustrated in section (b) of FIG. 9. When the "1. test-listening" has been selected, the music information server possessing the selected music piece delivers a corresponding test-listening (sample or trial) music piece data set (i.e., music piece data set dedicated to test-listening purposes, not a regular (for-sale or for-purchase) music piece data set) to the user. In this manner, the user can cause a test-listening music piece be audibly reproduced on the basis of the test-listening music piece data set received from the music information server, so that the user can confirm whether or not the selected music piece data set is satisfactory to the user. Note that no charge is billed for the test-listening music piece data set. At an appropriate point during the test-listening, the displayed screen on the client terminal apparatus switches to a "test-listened music piece purchasing" screen, where an inquiry is displayed as to whether the user wants to purchase the regular music piece data set of the test-listened music piece. If the test-listened music piece is satisfactory or agreeable to the user, the user selects "1. purchase" on the "test-listened music piece purchasing" screen, the music information server possessing the selected music piece data set delivers the for-purchase or regular music piece data set that is usable as an incoming-call alerting melody and the like, and a predetermined billing process is performed. If, on the other hand, the user selects "2. not purchase", the display returns to the music piece list screen shown in section (a) of FIG. 9, so that the user is allowed to select another music piece data set from the music piece list screen. By thus repeating test-listening, the user is allowed to search out and purchase a satisfactory music piece data set. Of course, the user may terminate the music piece search process of step S13 right after having only test-listened to the selected test-listening music piece data set without purchasing the corresponding regular music piece data set.

When the user wants to immediately purchase the selected music piece data set without test-listening, the user only has to select "2. purchase" on the screen illustrated in section (b) of FIG. 9. In such a case, the regular (for-purchase) music piece data set is delivered directly or via the portal server PS to the music information server possessing the selected music piece data set, without the test-listening executed, and a predetermined charge is billed to the user.

In the new release information process of step S10 of FIG. 8, new release information of any one of the music information servers is supplied via the portal server PS to the user in accordance with selection of the user. The portal server PS may cause the new release information of the music information servers to be delivered to the user, one by one or in a collective fashion. Further, this new release information process may be arranged to allow the user to test-listen to or purchase any one of listed newly-released music pieces in accordance with selection by the user.

In the music information supply system of the present invention, the portal site PS manages a predetermined community site with a view to enhancing convenience of the users and making the music information supply system more user-friendly. In the predetermined community site, there are provided a "virtual community space" where each of the users can write in opinions, impressions, etc. using the portal server PS or read or view information written by the other users etc., and a "statistical information supply site" including standings that indicate general popularity ranking of the music information supply servers MS based on popularity votes by the users and popularity ranking of the music information supply servers MS or music-piece-data producers specific to a given music piece.

To view the predetermined community site, the user first accesses the community site of the portal server PS by clicking an icon of the community site displayed at a predetermined position of the top page of the incoming-call alerting melody program (FIG. 8), and thereby opens the Web pages of the community site. On the top page of the community site, there are displayed menus of various functions available from the community site. Among the various functions available from the community site are (1) the above-mentioned "virtual community space", (2) the above-mentioned "statistical information supply site" and (3) a group mail function to be later described.

Further, among the statistical information supplied by the statistical information supply site are (a) "site ranking" (server popularity ranking) indicative of respective popularity of the music information supply servers, (b) "music-piece-specific site ranking" indicative of respective popularity of the respective popularity of the music information supply servers as regards a predetermined music piece, (c) "creator ranking" indicative of respective popularity of the music-piece-data creators, and (d) "site-by-site music piece ranking" indicative of respective popular music pieces of the music information supply servers. These rankings are displayed, for example, on the top page of the community site so that the user of any one of the client terminal apparatus can select and view any desired one of the rankings.

Figure 10:
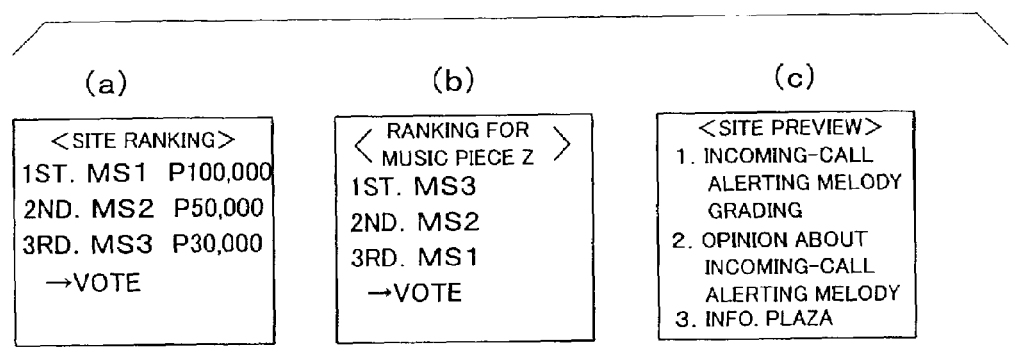
FIG. 10 is a conceptual diagram showing examples of screens displayed on the client terminal in relation to a virtual community space.

Section (a) of FIG. 10 shows an example of a "site ranking" display screen, on which the music information servers MS1 to MS3 are ranked, on the basis of popularity votes by the users, in descending order of popularity; in the illustrated example, the servers MS1, MS2 and MS3 are ranked in first, second and third places, respectively. On the site ranking display screen, there are also displayed the respective numbers of votes gained by the music information servers. Via the "site ranking" display screen, the user can vote for a desired one of the music information servers by designating the desired music information server and selecting (clicking) a predetermined displayed item "Vote".

Section (b) of FIG. 10 shows an example of a "music-piece-specific site ranking" display screen, on which the music information servers MS1 to MS3 are ranked as regards a given music piece Z, on the basis of popularity votes by the users, in descending order of popularity; in the illustrated example, the servers MS1, MS2 and MS3 are ranked in first, second and third places, respectively. This "music-piece-specific site ranking" display screen allows the user to know the popularity of the individual music information servers as regards the predetermined music piece. With this screen, the user can vote for a desired one of the music information servers as with the above-described "site ranking" display screen illustrated in section (a) of FIG. 10.

Although not specifically described here, screen display and popularity voting can be carried out for the "creator ranking" and "site-by-site music piece ranking" in a similar manner to the above-described "site rankings". By viewing such statistical information supply sites, the user can previously know degree of satisfaction afforded by a desired music piece data set and workmanship of the desired music piece data set, as well as popularity and quality of the individual music information servers. As a result, the music information supply system of the present invention can be extremely user-friendly or easy for each user to use.

Next, an example of the virtual community space is described. Once the user selects a menu item "virtual community space" on the top page of the community site, a "site preview" screen pops up as shown in section (c) of FIG. 10, where are displayed various user-participating spaces provided by the virtual community space. In the illustrated example, the user-participating spaces include: a "1. incoming-call alerting melody grading" space where any user can grade a desired music piece data set and view incoming-call alerting melody grading entered by other users; "2. opinions about incoming-call alerting melody" space where any user can enter his or her opinion and impression of a desired music piece data set and view opinions and impressions entered by other users; and "3, information plaza" space which is an information exchange space where users can write various information to each other and view information written in by other users. The user can access and view or participate in a desired one of the user-participating spaces by selecting (clicking) the desired user-participating space on the displayed screen.

Figure 11:
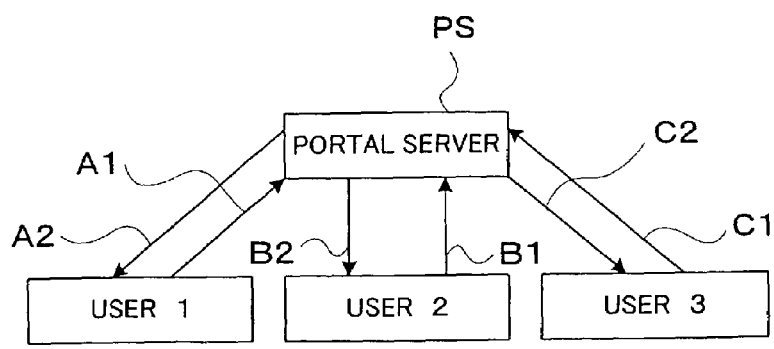
FIG. 11 is a conceptual diagram explanatory of a group mail function using the virtual community space.

This and following paragraphs describe the group mail function, with reference to FIG. 11. FIG. 11 is a conceptual diagram explanatory of a manner in which a plurality of users of the client terminals, "user 1", "user 2" and "user 3", communicate with each other via the portal server PS. According to the group mail scheme, a plurality of users having similar preferences and tendencies form groups, and the users of each of the groups communicate predetermined information, such as opinions and impressions, with each other. Let it be assumed here that any interested user has to declare and register musical preference information, such as his or her favorite musical genres and favorite singers, when enrolling in the music information supply system. The portal server PS classifies the enrolled users into predetermined groups on the basis of the musical preference information and creates a mailing list for each of the groups. The portal server PS manages group mails in accordance with the group-by-group mailing lists. For example, once "user 1" transmits a group mail to the portal server PS as represented by a flow of arrow A1 in FIG. 11, the portal server PS refers to the group-by-group mailing lists to thereby transmit the group mail to all of the users belonging to the same group as "user 1" (i.e., "user 1", "user 2" and "user 3") as represented by arrows A2, B2 and C2. Similarly, when "user 2" or "user 3" transmits a group mail to the portal server PS, the group mail is transmitted by the portal server PS to all of "user 1", "user 2" and "user 3". In this manner, the music information supply system of the present invention allows all of the users having similar preferences to communicate with each other and transmit mails without their mail addresses being disclosed to any third party.

The enrollment and the subsequent classification of the individual users into the respective groups may be automatically performed on the basis of purchase/use history information of the individual users cumulatively stored in the portal server PS, in place of or in addition to the musical preference information declared at the time of the enrollment. For example, a plurality of groups may be set in accordance with various classification standards, such as those about the musical genre, singer, composer and player. Each time any of the users performs operation to purchase a desired music piece data set, the portal server PS may make a determination as to whether the purchase/use history information of the user having been cumulatively stored so far has now become correspondent to the classification standards of a given one of the groups. If it is determined that the purchase/use history information of the user has now become correspondent to the classification standards of the given group, then that user is automatically added to the group mailing list as a new member of the given group. In the instant embodiment, settings can be made for preventing a group mail from being delivered to a particular user. Also, settings can be made for allowing a user to join his or her desired group. Further, because the system allows only the enrolled users of the portal server PS to transmit a mail, sufficient security of the personal information etc. can be guaranteed.

Figure 12:
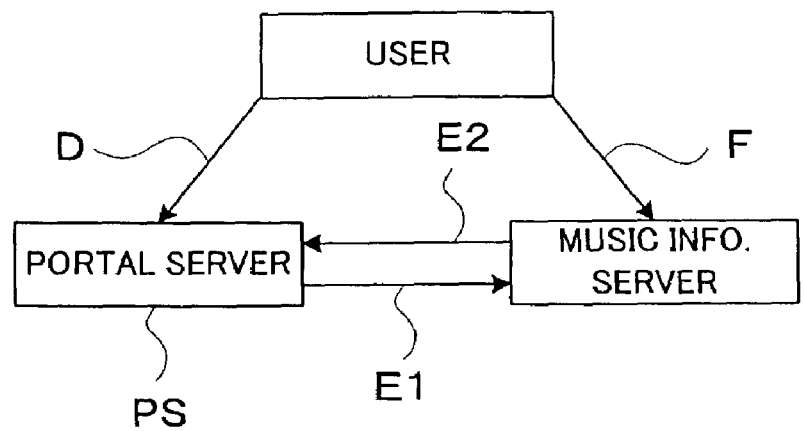
FIG. 12 is a schematic diagram showing exemplary monetary flows among a user of the client terminal, the portal server and the music information server.

This and following paragraphs describe an example of monetary (giving and receiving) relationships among the users (of the portable communication terminals PT), the portal server PS and the music information servers, with reference to FIG. 12. In the instant embodiment, a charge for a music piece data set purchased by the user can be paid in either of the following two ways. According to the first way of payment, the user makes direct payment to the music information server having supplied the desired music piece data set, as represented by a flow of arrow F. For example, before the user downloads a music piece data set to be purchased from any one of the music information servers, a predetermined billing process is carried out so that the user pays the necessary charge to the music information server. The charge may be settled in any suitable manner, such as by a credit card, payment from a bank account or electronic money. Of course, for the settlement, the user communicates with another computer managed by a credit company or bank to transmit his or her user information, charged-amount information, etc. In this case, no monetary transfer (giving and receiving) takes place between the portal server PS and the user; however, in accordance with predetermined prior agreements between the portal server PS and the music information server, a monetary transfer takes place, as appropriate, between the servers, and thus the business transaction is carried out. For example, depending on the agreements, the portal server PS may pay royalties to the music information server as represented by a flow of arrow E1, or conversely the music information server may pay royalties to the portal server PS as represented by arrow E2. In some cases, the music information server may make payment to the portal server PS under the name of an advertisement fee, as also represented by arrow E2.

According to the second way of payment, the portal server PS functions as a collective charge collecting window for the individual music information servers and is paid by the user as represented by arrow D. In this case, before the user downloads a music piece data set to be purchased from any one of the music information servers, the music information server transmits a charge collection request to the portal server PS, in response to which the portal server PS performs a predetermined billing process to collect a predetermined charge from the user. For example, the portal server PS transmits billing information to the user, by e-mail or otherwise, to request payment or settlement from the user. In response to the billing information received from the portal server PS, the user accesses the portal server PS to attend to settlement of the charged amount corresponding to the billing information. As notes earlier, the settlement of the charge may be performed in any suitable manner, such as by a credit card, payment from a bank account or electronic money. In this case, no monetary transfer takes place between the portal server PS and the user; however, in accordance with predetermined prior agreements between the portal server PS and the music information server, a monetary transfer takes place, as appropriate, between the servers, and thus the business transaction is carried out. For example, depending on the agreements, the portal server PS may pay predetermined proportions of its profits, corresponding for example to monthly sales, to the music information servers as indicated by arrow E1. In some cases, the music information server may make payment to the portal server PS under the name of an advertisement fee, as also represented by arrow E2.

Figure 13:
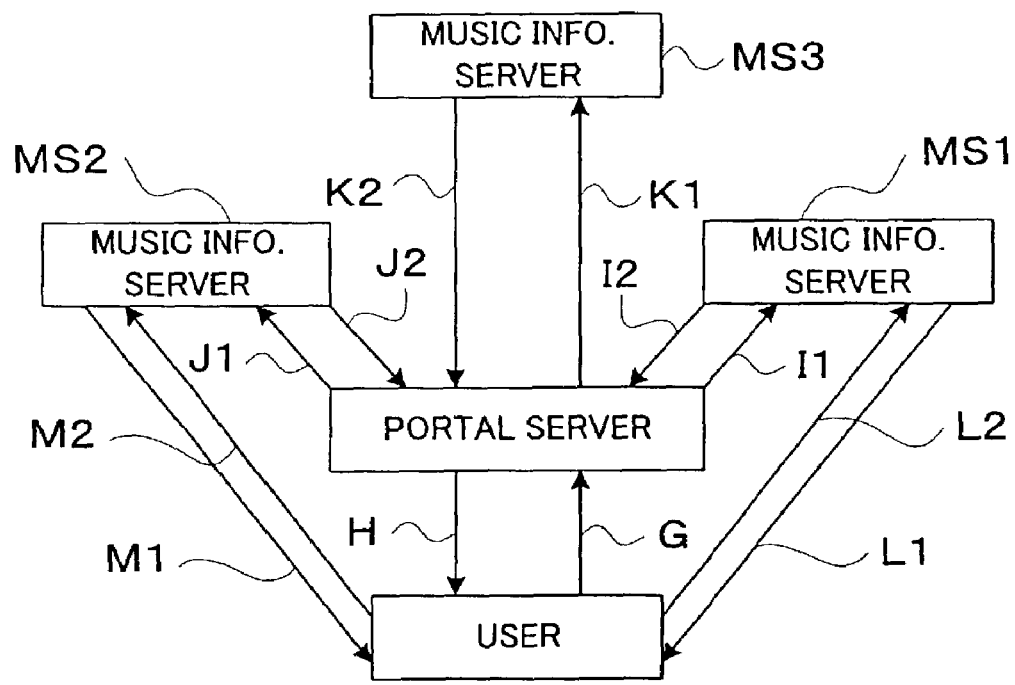
FIG. 13 is a diagram schematically showing flows of various information communicated between the client terminal and the servers in the music information supply system.

Now, with reference to FIG. 13, a description will be made about an example of various operations that are carried out at the time of test-listening and purchase of a music piece data set. FIG. 13 is a diagram schematically showing flows of various information communicated between the client terminal and the servers in the music information supply system.

As noted above, the search, selection, test-listening and purchase, for a desired music piece, are carried out in accordance with the incoming-call alerting melody program of FIG. 8. The user starts up the incoming-call alerting melody program, enters one or more desired search words or conditions (let it be assumed here that the user enters "music piece 1" as the search condition) and requests the portal server PS to search for a desired music piece, as indicated in FIG. 13 by arrow G. In response to the search request, the portal server PS inquires of the music information servers MS1 to MS3 about whether they have data sets of user-desired "music piece 1", as indicated by arrows I1, J1 and K1. In response to the inquiry from the portal server PS, the music information servers MS1 to MS3 return their respective list information regarding the user-desired music piece, as indicated by arrows I2, J2 and J2; for example, from the respective list information, the portal server PS knows that the music information server MS1 has one music piece data set of "music piece 1", the server MS2 has two music piece data sets of "music piece 1" and the server MS2 has no music piece data set of "music piece 1". Then, on the basis of the list information from the music information servers MS1 to MS3, the portal server PS creates a music piece list corresponding to the user-entered search condition and transmits the thus-created music piece list to the user, as represented by arrow H. The music piece list is displayed on the display device of the user's terminal apparatus (see section (a) FIG. 9).

Then, the user selects, for example, the data set of "music piece 1" of the music information server MS1 and transmits, to the portal server PS, a test-listening request for the selected music piece data set. In response to the test-listening request from the user, the portal server PS transmits, to the music information server MS1, instruction information to urge the server MS1 to deliver the test-listening data of the user-selected music piece to the user, as indicated by arrow I1. Then, on the basis of the instruction information from the portal server PS, the music information server MS1 transmits the test-listening data set of "music piece 1" (as represented by arrow L1). The test-listening music piece data set is in the form of streaming data to be reproduced on the user's terminal apparatus immediately as the data is received from the server, and the user can not store the data in the terminal apparatus. In this way, the user can test-listen to the data set of "music piece 1" supplied by the music information server MS1. By performing similar operation, the user can test-listen to a reproduction of the test-listening data of "music piece 1" supplied by the other music information server as well. Namely, the user is allowed to test-listen to reproductions of the test-listening data of a same music piece supplied by two or more music information servers.

After the test-listening, the user transmits, to the portal server PS, a request for purchasing the regular music piece data of "music piece 1" supplied, for example, by the music information server MS2 (as represented by arrow G). Then, the portal server PS forwards the purchase request to the music information server MS2, as represented by arrow J1. As an example, when the charge for the regular music piece data of "music piece 1" to be purchased is to be paid by the user directly to the music information server MS2, the server MS2 inquires of the user about his or her membership registration number and registered name (as represented by arrow M1), and, if the user has already been enrolled in the music information supply system, the server MS2 receives the registration number and registered name from the user (as represented by arrow M2). In case the user has not yet been enrolled in the system, the portal server PS prompts the user to enroll in the system (as represented by arrow M1), in response to which the user applies for enrollment in the system (arrow M2). Upon completion of the necessary enrollment, the music information server MS2 informs the user that the necessary enrollment has been duly completed as represented by the flow of arrow M1. Then, the music information server MS2 carries out a predetermined billing process to bill the user for purchase of the regular (for-purchase) music piece data of "music piece 1" as represented by the flow of arrow M2. The billing process is carried out in the above-described manner. When the user wants to test-listen to and purchase the data of another music piece, operations similar to the above-described are repeated, during which the portal server PS is held in a standby position.

To download the purchased data of the music piece, the user first terminates the incoming-call alerting melody program being executed on the client terminal PT. The portal server PS then detects and notifies the termination of the incoming-call alerting melody program to the music information server MS2 having billed the charge to the user, as represented by the flow of arrow J1. In response to the notice, the music information server MS2, by e-mail or otherwise, informs the user of a URL indicative of a location, in the music piece data database, of the purchased music piece data, as represented by the flow of arrow M1. The user then enters the informed URL on a browser screen to thereby fetch the purchased music piece data set (as represented by the flow of arrow M2) via the communication network X, and downloads the fetched music piece data set into the storage device 22 or 23 of his or her client terminal PT (as represented by the flow of arrow Mi). In this way, the user can acquire the data set of desired "music piece 1" and use it as an incoming-call alerting melody. When the user has selected purchasing two or more music piece data sets at the same time, two or more URLs are informed to the user, so that the user repeats the URL entry and music piece data downloading.

The embodiment has been described in relation to the case where the portal server PS inquires of the music information server MS1 to MS3 in response to the search request from the user. Alternatively, the portal server PS may have prestored therein list information of music pieces possessed or suppliable by the music information servers MS1 to MS3. In such a case, the portal server PS supplies the user with the prestored music piece list information of the servers MS1 to MS3, in response to the search request from the user. To update the music piece list information, the portal server PS inquires of the music information servers MS1 to MS3 about the latest information of the respective music piece data databases, as represented by the flows of arrows I1, J1 and K1. In response to the inquiry, the music information servers MS1 to MS3 supply the portal server PS with the latest information, as represented by the flows of arrows I2, J2 and K2. It is preferable that such operations be performed on a periodical basis as frequently as possible.

This paragraph describe operations performed in the case where the portal server PS functions as a collective collecting window, in behalf of the music information servers, to receive, from the user, payment for a purchased music piece data set. For example, when the user has selected purchasing a music piece data set from the music information server MS3, the server MS3 requests the portal server PS to collect the charge from the user (as represented by the flow of arrow K2). Then, the portal server PS transmits billing information to the user by e-mail or otherwise (as represented by the flow of arrow H). In response to the billing information received from the portal server PS, the user accesses the portal server PS to attend to settlement of the charge with the portal server PS (as represented by the flow of arrow G). The billing process is carried out in the above-described manner. After that, the purchased music piece data set is downloaded in a similar manner to the above-described. Namely, upon completion of the predetermined billing process, the portal server PS informs the music information server MS3 of the completion of the predetermined billing process, in response to which the music information server MS3 informs, by e-mail or otherwise, the user of a URL indicative of a location, in the music piece data database, of the purchased music piece data. The user then enters the informed URL on the browser screen to thereby fetch the purchased music piece data set via the communication network X, and downloads the fetched music piece data set into the storage device 22 or 23 of his or her client terminal PT. The portal server PS pays predetermined proportions of its profits (i.e., consideration), corresponding for example to monthly sales of the servers MS1 to MS3, to the servers MS1 to MS3 as represented by the flows of arrows I1, J1 and K1.

Now, a description is made about managing operations carried out by the portal server PS. One example of the managing operations is to collect advertisement fees or membership fees, monthly or the like, from the music information servers MS1 to MS3. Although, as one possible form of monetary management in the music information supply system of the invention, the portal server PS may collect charges for use of the system from the individual users, it is more preferable that advertisement fees or membership fees be collected from the individual music information servers joining the music information supply system, because, in that case, the user do not have to pay extra charges. Another example of the managing operations carried out by the portal server PS is to manage payment of royalties on copyrights etc. Royalties on copyrights, which become payable in accordance with operations of the music information supply system may be paid to predetermined copyright management organizations in any appropriate manner; for example, the portal server PS may pay the royalties collectively in behalf of the music information servers, or the portal server PS and music information servers pay the royalties in a shared fashion, or only the music information servers may pay the royalties.

It should be appreciated that the data supplied by the music information servers in the inventive music information supply system may be other than music piece data, such as appropriate data representative of effect sounds and/or human voices. Further, the data supplied by the music information servers may be other than coded data in the MIDI format or the like, such as waveform data like PCM data or ADPCM data. Namely, in the context of the present invention, all of the above-mentioned data are referred to as "music content".

In summary, the present invention arranged in the above-described manner advantageously allows the user of any one of the client terminal apparatus to acquire any one of music piece data sets possessed or suppliable by a plurality of music information servers, so that the user can minimize wasteful expense. Further, by the portal server operating a predetermined virtual community space, convenience of the users can be greatly enhanced, and the music information supply system can be made very user-friendly.

The present invention relates to the subject matter of Japanese Patent Application No.2001-203655, filed on Jul. 4, 2001, the disclosure of which is expressly incorporated herein by reference in its entirety.

What is claimed is:

1. A portal server connecting with a plurality of content supply servers and also connectable with a client terminal via a communication network, each of said plurality of content supply servers having music content and being connectable with the client terminal by itself, said portal server comprising:
    a first transmission section that transmits, to said client terminal, a list of music content, suppliable by at least one of said plurality of content supply servers, at least two items of music content of a same music piece being enumerated on the list, each of the items of music content of the same music piece having added thereto display information pertaining to a musical characteristic of the music content, whereby, in said client terminal, desired music content can be selected based on the list transmitted by said portal server;
    a first reception section that receives selection information, based on selection of the desired music content in said client terminal, transmitted by said client terminal; and
    a second transmission section that, based on the selection information received by said first reception section, transmits instruction information to urge at least one of said plurality of content supply servers to transmit the desired music content to said client terminal, whereby said at least one of said plurality of content supply servers having received the instruction information is capable of transmitting the desired music content to said client terminal directly or via said portal server.

2. A portal server as claimed in claim 1 wherein the list transmitted by said first transmission section is a list of music content created in response to a given search request from said client terminal, the list of music content enumerating all music content that corresponds to the given search request and is suppliable said the content supply servers.

3. A portal server as claimed in claim 2 which further comprises a second reception section that, in response to the given search request from said client terminal, receives information of the music content suppliable by the content supply servers, and a creation section that creates the list based on the information received by said second reception section.

4. A portal server as claimed in claim 2 wherein the given search request is intended to search for a particular music piece name, whereby said client terminal is capable of, based on the list transmitted by said first transmission section, selecting music content of the particular music piece name from said plurality of content supply servers.

5. A portal server as claimed in claim 1 wherein the selection information includes content identification information for identifying music content and content-supply-server identification information for identifying a content supply server, and wherein said content supply server capable of transmitting the desired music content is identified based on the content-supply-server identification information included in the selection information and the desired music content is identified based on the content identification information included in the selection information.

6. A portal server as claimed in claim 1 wherein the music content possessed by the content supply servers is for test-listening by a user of said client terminal.

7. A portal server as claimed in claim 1 wherein the desired music content is for purchase by the user of said client terminal, and
    wherein said portal server further comprises:
        a billing section that bills the user of said client terminal for the desired music content to be transmitted; and
        a share provision section that performs a process for providing said content supply server, having supplied the desired music content, with a predetermined share corresponding to an amount of money billed to the user.

8. A portal server as claimed in claim 1 wherein the display information pertaining to the musical characteristic of the music content is display information about an arrangement, musical key and mixing of the music piece.

9. A portal server connecting with a plurality of content supply servers and also connectable with a client terminal via a communication network, each of said plurality of content supply servers having music content, said portal server comprising:
    a first transmission section that transmits a list of music content, suppliable by said plurality of content supply servers, in response to a request from said client terminal, whereby, in said client terminal, desired music content can be selected based on the list transmitted by said portal server; and
    a second transmission section that transmits, to said client terminal, data related to a virtual community space defined by information received from said plurality of content supply servers or music content possessed by said plurality of content supply servers, wherein predetermined information is allowed to be written, by a user of said client terminal, into said virtual community space, and the written predetermined information is allowed to be browsed by another user,
    wherein desired music content selected in said client terminal is delivered to said client terminal from a corresponding one of said content supply servers directly or via said portal server, wherein said portal server cumulatively stores use history information pertaining to delivery of music piece data to a user of said client terminal, determines whether or not the cumulatively-stored use history information of the user has become correspondent to a preset classification standard of any one of a plurality of groups, and adds the user to a mailing list of the one group as a member of the group if said portal server determines that the cumulatively-stored use history information of the user has become correspondent to the preset classification standard, and wherein the user of said client terminal can make a setting to prevent a group mail from being delivered to said client terminal.

10. A portal server as claimed in claim 9 wherein said virtual community space includes at least one of a space for showing statistical information indicative of respective popularity of said plurality of content supply servers, a space for showing statistical information indicative of respective popularity of individual music content and a space for showing statistical information indicative of respective popularity of music content producers.

11. A portal server as claimed in claim 9 wherein said portal server is connectable with a plurality of client terminals and further comprises a classification section that classifies said plurality of client terminals, connected with said portal server, into client groups, whereby any one of the client terminals belonging to a particular one of the client groups is allowed to use a group mail to communicate information with any other client terminal within the particular client group.

12. A portal server connecting with a plurality of content supply servers and also connectable with a client terminal via a communication network, each of said plurality of content supply servers having music content and being connectable with the client terminal by itself, said portal server comprising a processor adapted to:

transmit, to said client terminal, a list of music content, suppliable by at least one of said plurality of content supply servers, at least two items of music content of a same music piece being enumerated on the list, each of the items of music content of the same music piece having added thereto display information pertaining to a musical characteristic of the music content, whereby, in said client terminal, desired music content can be selected based on the list transmitted by said portal server;

receive selection information, based on selection of the desired music content in said client terminal, transmitted by said client terminal; and based on the received selection information, transmit instruction information to urge at least one of said plurality of content supply servers to transmit the desired music content to said client terminal, whereby said at least one of said plurality of content supply servers having received the instruction information is capable of transmitting the desired music content to said client terminal directly or via said portal server.

13. A portal server connecting with a plurality of content supply servers and also connectable with a client terminal via a communication network, each of said plurality of content supply servers having music content, said portal server comprising a processor adapted to:

transmit a list of music content, suppliable by said plurality of content supply servers, in response to a request from said client terminal, whereby, in said client terminal, desired music content can be selected based on the list transmitted by said portal server; and transmit, to said client terminal, data related to a virtual community space defined by information received from said plurality of content supply servers or music content possessed by said plurality of content supply servers, wherein predetermined information is allowed to be written, by a user of said client terminal, into said virtual community space, and the written predetermined information is allowed to be browsed by another users, wherein desired music content selected in said client terminal is delivered to said client terminal from a corresponding one of said content supply servers directly or via said portal server, wherein said portal server cumulatively stores use history information pertaining to delivery of music piece data to a user of said client terminal, determines whether or not the cumulatively-stored use history information of the user has become correspondent to a preset classification standard of any one of a plurality of groups, and adds the user to a mailing list of the one group as a member of the group if said portal server determines that the cumulatively-stored use history information of the user has become correspondent to the preset classification standard, and wherein the user of said client terminal can make a setting to prevent a group mail from being delivered to said client terminal.

14. A computer program embodied on a tangible computer readable storage medium containing a group of instructions for causing a computer to perform an information communication method for use in a portal server connecting with a plurality of content supply servers and also connectable with a client terminal via a communication network, each of said plurality of content supply servers having music content and being connectable with the client terminal by itself, said information communication method comprising:

a first step of transmitting, to said client terminal, a list of music content, suppliable by at least one of said plurality of content supply servers, at least two items of music content of a same music piece being enumerated on the list, each of the items of music content of the same music piece having added thereto display information pertaining to a musical characteristic of the music content, whereby, in said client terminal, desired music content can be selected based on the list transmitted by said portal server;

a second step of receiving selection information, based on selection of the desired music content in said client terminal, transmitted by said client terminal; and a third step of, based on the selection information received by said second step, transmitting instruction information to urge at least one of said plurality of content supply servers to transmit the desired music content to said client terminal, whereby said at least one of content supply servers having received the instruction information is capable of transmitting the desired music content to said client terminal directly or via said portal server.

15. A computer program embodied on a tangible computer readable storage medium containing a group of instructions for causing a computer to perform an information communication method for use in a portal server connecting with a plurality of content supply servers and also connectable with a client terminal via a communication network, each of said plurality of content supply servers having music content, said information communication method comprising:

a first step of transmitting a list of music content, suppliable by said plurality of content supply servers, in response to a request from said client terminal, whereby, in said client terminal, desired music content can be selected based on the list transmitted by said portal server; and a second step of transmitting, to said client terminal, data related to a virtual community space defined by information received from said plurality of content supply servers or music content possessed by said plurality of content supply servers, wherein predetermined information is allowed to be written, by a user of said client terminal, into said virtual community space, and the written predetermined information is allowed to be browsed by another user, wherein desired music content selected in said client terminal is delivered to said client terminal from a corresponding one of said content supply servers directly or via said portal server, wherein said portal server cumulatively stores use history information pertaining to delivery of music piece data to a user of said client terminal, determines whether or not the cumulatively-stored use history information of the user has become correspondent to a preset classification standard of any one of a plurality of groups, and adds the user to a mailing list of the one group as a member of the group if said portal server determines that the cumulatively-stored use history information of the user has become correspondent to the preset classification standard, and wherein the user of said client terminal can make a setting to prevent a group mail from being delivered to said client terminal.

* * * * *